(12) United States Patent
Lu et al.

(10) Patent No.: US 11,917,417 B2
(45) Date of Patent: Feb. 27, 2024

(54) METHOD FOR PREVENTING HARDWARE WALLET FROM BEING MALICIOUSLY PAIRED

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 246 days.

(21) Appl. No.: 17/611,235

(22) PCT Filed: Dec. 26, 2019

(86) PCT No.: PCT/CN2019/128562
§ 371 (c)(1),
(2) Date: Nov. 15, 2021

(87) PCT Pub. No.: WO2021/047110
PCT Pub. Date: Mar. 18, 2021

(65) Prior Publication Data
US 2022/0240096 A1    Jul. 28, 2022

(30) Foreign Application Priority Data
Sep. 9, 2019  (CN) .......................... 201910849427.1

(51) Int. Cl.
*G06F 21/00* (2013.01)
*H04W 12/50* (2021.01)
*H04W 76/14* (2018.01)
*G06Q 20/36* (2012.01)
*H04W 12/06* (2021.01)
*H04W 12/08* (2021.01)

(52) U.S. Cl.
CPC ............ *H04W 12/50* (2021.01); *G06Q 20/36* (2013.01); *H04W 12/06* (2013.01); *H04W 12/08* (2013.01); *H04W 76/14* (2018.02)

(58) Field of Classification Search
CPC ..... H04W 12/06; H04W 12/08; H04W 12/50; H04W 76/14; G06Q 20/36
See application file for complete search history.

(56) References Cited

U.S. PATENT DOCUMENTS

| | | |
|---|---|---|
| 2014/0179234 A1 | 6/2014 | Lee et al. |
| 2014/0244514 A1* | 8/2014 | Rodriguez ........... G06Q 20/227 348/150 |
| 2019/0095907 A1* | 3/2019 | Govindarajan ........... H04L 9/12 |

* cited by examiner

Primary Examiner — Jeffrey C Pwu
Assistant Examiner — Thong P Truong
(74) Attorney, Agent, or Firm — Hammer & Associates, P.C.

(57) ABSTRACT

A method for preventing a hardware wallet from being maliciously paired, comprising: a hardware wallet waiting to receive a connection request; when a connection request is received, determining whether a first terminal sending the connection request has been paired and connected; if so, waiting to receive an instruction of the first terminal; and when receiving a pairing transfer instruction sent by the first terminal, clearing terminal information stored in a whitelist of the hardware wallet. By means of the present technical solution, a hardware wallet can achieve pairing transfer only by means of the authorization of a previously paired terminal, thereby improving the security of the hardware wallet.

16 Claims, 5 Drawing Sheets

METHOD FOR PREVENTING HARDWARE WALLET FROM BEING MALICIOUSLY PAIRED

FIELD OF THE INVENTION

The present invention relates to a method for avoiding a hardware wallet being matched without authorization, which belongs to the information security field.

PRIOR ART

With the development of internet, digital currency becomes more popular, thus it is a big problem to be urgently solved that users need a safer digital currency; at present, a private key of digital currency is stored in a chip of a hardware wallet which is isolated from the internet and is connected with the internet when used, in this way, the digital currency in the hardware wallet is safer.

However, currently, the hardware wallet which communicates via Bluetooth can match with anyone of multiple of mobile terminals at the moment, so it can connect to the mobile terminal of other people when the hardware wallet is stolen; in this way, other people can check data, such as amount of assets and transaction records, in the hardware wallet, and may be the PIN code of the hardware wallet is known, so that the digital asset in the hardware wallet is not safe anymore.

SUMMARY OF THE INVENTION

The object of the present invention is to provide a method for avoiding a hardware wallet being matched without authorization and a hardware wallet, which can be matched from one mobile terminal to another mobile terminal only when it is used to be authorized by the matched mobile terminal, so that the method makes the hardware wallet safer.

Thus, according to one aspect of the present invention, there is provided a method for avoiding a hardware wallet being matched without authorization, comprising Step s1, waiting, by the hardware wallet, for receiving a connecting request, and executing Step s2 when the connecting request is received;

Step s2, parsing, by the hardware wallet, the connecting request to obtain terminal information of a first terminal, checking a white list stored by the hardware wallet, and determining whether the white list is empty, if yes, connecting to the first terminal, and storing the terminal information of the first terminal into the white list, and executing Step s4; otherwise, executing Step s3;

Step s3, determining, by the hardware wallet, whether the terminal information stored in the white list is the same as the terminal information of the first terminal, if yes, connecting with the first terminal, executing Step s4; otherwise, rejecting to connect with the first terminal, and returning to Step s1;

Step s4, determining, by the hardware wallet, whether the hardware wallet is matched with the first terminal, if yes, executing Step s5; otherwise, the hardware wallet matches with the first terminal, executing Step s5;

Step s5, waiting, by the hardware wallet, for receiving an instruction from the first terminal, determining a type of the instruction when the instruction is received, executing Step s6 in the case that the instruction is a shifting match instruction; executing corresponding operation in the case that the instruction is another instruction, and ending the procedure; and Step s6, deleting, by the hardware wallet, the terminal information of the first terminal stored in the white list, and returning to Step s1.

Preferably, before Step s1, the method further includes turning on the hardware wallet.

Preferably, the terminal information of the first terminal in Step s2 includes a name of the first terminal and a MAC address of the first terminal.

Preferably, Step s4 specifically includes that

Step s4-1, determining, by the hardware wallet, whether the terminal information of the first terminal is stored in a matching list stored in the hardware wallet, if yes, the hardware wallet has matched to the first terminal, and executing Step s5; otherwise, executing Step s4-2;

Step s4-2, waiting, by the hardware wallet, for a first matching request sent from the first terminal, matching with the first terminal in the case that the first matching request is received, and executing Step s5.

Preferably, before deleting the terminal information of the first terminal in Step s6, the method further comprises that the hardware wallet parses the shifting match instruction to obtain terminal information of a second terminal; and after deleting the terminal information of the first terminal stored in the hardware wallet, the method further comprises that storing the terminal information of the second terminal into the white list.

Preferably, before the terminal information of the second terminal is stored in the white list, the method further includes that the hardware wallet determines whether the terminal information of the second terminal is legitimate, if yes, the terminal information of the second terminal is stored in the hardware wallet; otherwise, returns a rejecting to connect response to the second terminal, ends the procedure.

Preferably, the hardware wallet determining whether the terminal information of the second terminal is legitimate specifically comprises:

Step s01, receiving, by the hardware wallet, a second connecting request sent from the second terminal, parsing the second connecting request to obtain the terminal information of the second terminal; and Step s02, determining, by the hardware wallet, the terminal information of the second terminal which is obtained by parsing the second connecting request is the same as the terminal information of the second terminal which is obtained by parsing the shifting match instruction, if yes, the terminal information of the second terminal is legitimate; otherwise, the terminal information of the second terminal is illegitimate.

Preferably, after the hardware wallet matches with and connects to the second terminal, the method further includes that the hardware wallet stores the terminal information of the second terminal into the matching list of the hardware wallet.

According to the other aspect of the present invention, there is provided for avoiding a hardware wallet being matched without authorization, which includes a first receiving module which is configured to wait for receiving a connecting request, and trigger a parsing module when the connecting request is received;

a parsing module which is configured to parse the connecting request to obtain terminal information of the first terminal when the first receiving module receives the connecting request;

a first determining module which is configured to check a white list stored in the hardware wallet, and to determine whether the white list is empty;

a connecting module which is configured to permit the hardware wallet connect to the first terminal, and to put the terminal information of the first terminal into the white list;

a second determining module which is configured to determine whether the terminal information stored in the white list is the same as the terminal information of the first terminal when the first determining module determines that the white list is not empty;

the connecting module is further configured to permit the hardware wallet to connect to the first terminal when the second determining module determines that the terminal information stored in the white list is the same as the terminal information of the first terminal, and trigger a third determining module;

a rejecting module which is configured to reject to connect to the first terminal and to trigger the first receiving module when the second determining module determines that the terminal information stored in the white list is not the same as the terminal information of the first terminal;

a third determining module which is configured to determine whether the hardware wallet has matched with the first terminal;

a matching module which is configured to match with the first terminal when the third determining module determines that the hardware wallet has not matched with the first terminal, and trigger a second receiving module;

the second receiving module which is configured to receive an instruction sent from the first terminal when the third determining module determines that the hardware wallet has matched with the first terminal;

the second receiving module is further configured to receive the instruction sent from the first terminal after the matching module matches with the first terminal;

a fourth determining module which is configured to determine a type of the instruction when the second receiving module received the instruction from the first terminal, trigger a deleting module when the instruction from the first terminal is a shifting match instruction; and trigger corresponding module when the instruction is other instruction;

the deleting module which is configured to delete the terminal information of the first terminal stored in the white list and to trigger the first receiving module when the fourth determining module determine that the instruction is the shifting match instruction; and an executing module which is configured to execute corresponding operation according to the instruction when the fourth determining module determines that the instruction is other instruction.

Preferably, the hardware wallet further comprises a turning on module which is configured to turn on the hardware wallet.

Preferably, the terminal information of the first terminal includes a name of the first terminal and a MAC address of the first terminal.

Preferably, the third determining module includes a determining sub-module which is configured to determine whether the matching list stored in the hardware wallet stores the terminal information of the first terminal;

a receiving sub-module which is configured to receive a first matching request sent from the first terminal when the determining sub-module determines that there is no the terminal information of the first terminal in the matching list; and a matching sub-module which is configured to match with the first terminal and to trigger the second receiving module when the receiving sub-module receives the first matching request sent from the first terminal.

Preferably, the hardware wallet further includes a second parsing module which is configured to parse the shifting match instruction to obtain the terminal information of the second terminal before the deleting module deletes the terminal information of the first terminal stored in the white list; and a storing module which is configured to store the terminal information of the second terminal into the white list after the deleting module deletes the terminal information of the first terminal stored in the white list.

Preferably, the hardware wallet further includes a fifth determining module which is configured to determine whether the terminal information of the second terminal is legitimate before the storing module stores the terminal information of the second terminal into the white list;

the storing module is specifically configured to store the terminal information of the second terminal into the white list when the fifth determining module determines that the terminal information of the second terminal is legitimate; and a returning module which is configured to return a rejecting connection response to the second terminal when the fifth determining module determines that the terminal information of the second terminal is illegitimate.

Preferably, the fifth determining module comprises a receiving sub-module which is configured to receive a connecting request sent from the second terminal;

a parsing sub-module which is configured to parse the second connecting request received by the receiving sub-module from the second terminal to obtain the terminal information of the second terminal; and a second determining sub-module which is configured to determine whether the terminal information of the second terminal obtained by parsing the connecting request is the same as the terminal information of the second terminal obtained by parsing the shifting match instruction.

Preferably, the storing module is further configured to store the terminal information of the second terminal into the matching list of the hardware wallet after the hardware wallet matches with and connects to the second terminal.

According to the present invention, after the hardware wallet matches with one mobile terminal of a user via Bluetooth, the hardware wallet needs authorization of the one mobile terminal which has bound with the hardware wallet already if the hardware wallet needs to match with another mobile terminal, in this way, the hardware wallet becomes much safer.

DESCRIPTION OF EMBODIMENTS

The technical solution in the embodiments of the present invention is further described more clearly and completely with drawings of the present invention. Apparently, embodiments described herein are just part of embodiments of the present invention. On the basis of the embodiments of the present invention, all other related embodiments made by those skilled in the art without paying any inventive work belong to the scope of protection of the present invention.

Embodiment 1

Figure 1:
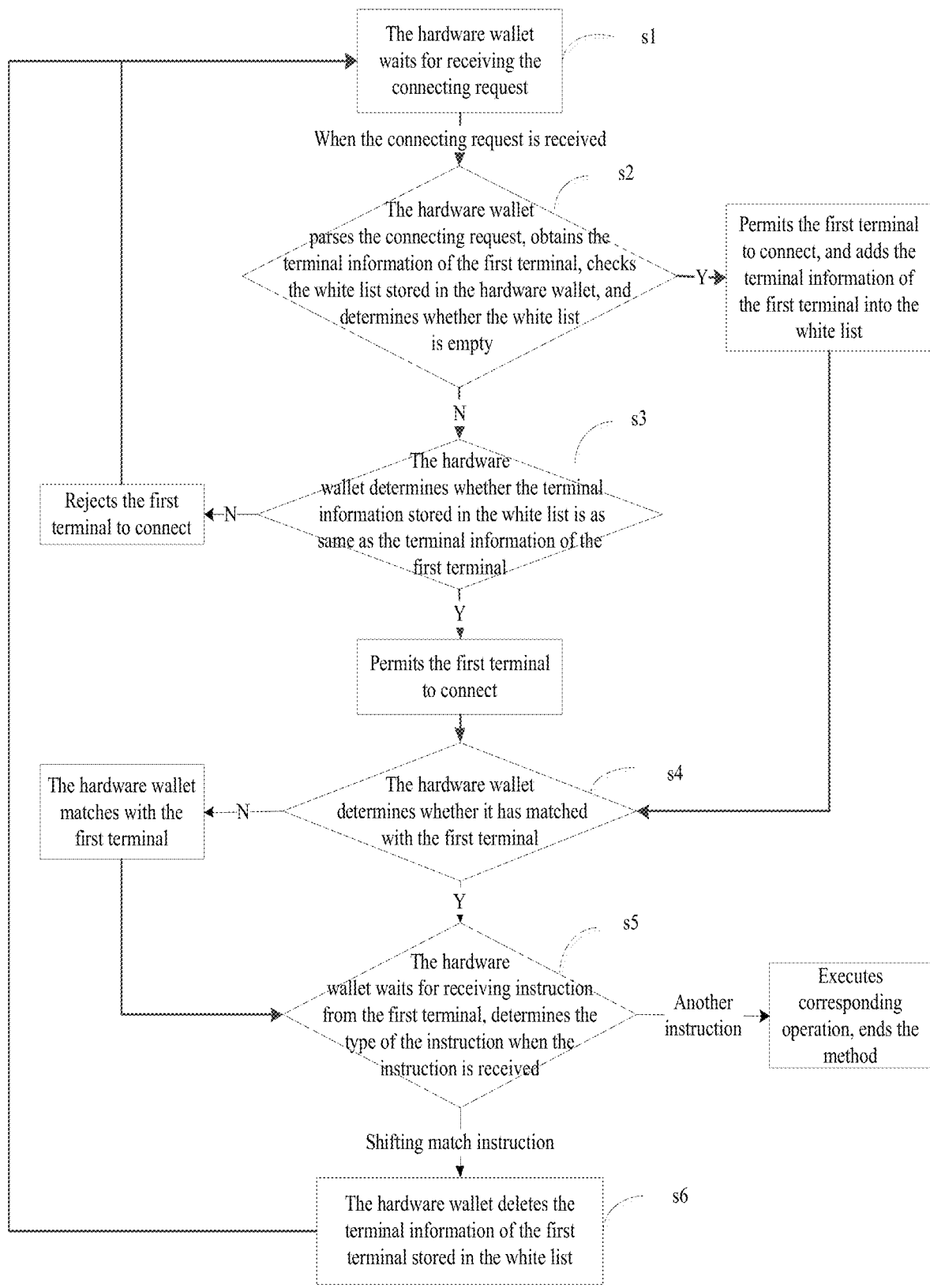
FIG. 1 is a flow diagram of a method for avoiding a hardware wallet from being matched without authorization according to Embodiment 1 of the present invention.

According to Embodiment 1 of the present invention, it provides a method for avoiding a hardware wallet from being matched without authorization, as shown in FIG. 1, comprising Step s1, the hardware wallet waits for receiving a connecting request, and executes Step s2 when the connecting request is received;

Step s2, the hardware wallet parses the connecting request to obtain terminal information of a first terminal, checks a white list stored in the hardware wallet, determines whether the white list is empty, if yes, permits the first terminal to connects to the hardware wallet, and adds the terminal information of the first terminal into the white list, and executes Step s4; otherwise, executes Step s3;

Step s3, the hardware wallet determines whether terminal information stored in the white list is the same as the terminal information of the first terminal, if yes, permits the first terminal to connect to the hardware wallet, and executes Step s4; otherwise, rejects the first terminal to connect to the hardware wallet, and returns to Step s1;

Step s4, the hardware wallet determines whether it has matched with the first terminal, if yes, executes Step s5; otherwise, matches with the first terminal, and executes Step s5;

Step s5, the hardware wallet waits for receiving an instruction sent from the first terminal, determines a type of the instruction when the instruction is received, executes Step s6 in the case that the instruction is a shifting match instruction; and executes corresponding operation in the case that the instruction is another type of instruction, then ending the process Step s6, the hardware wallet deletes the terminal information of the first terminal stored in the white list, then returns to Step s1.

Preferably, before Step s1, the method further includes a step on that the hardware wallet is turned on.

Preferably, the terminal information of the first terminal in Step s2 includes a name of the first terminal and a MAC address of the first terminal.

Preferably, Step s4 specifically includes

Step s4-1, the hardware wallet determines whether the terminal information of the first terminal is included in a matching list stored in the hardware wallet, if yes, the hardware wallet has matched with the first terminal, and executes Step s5; otherwise, executes Step s4-2; and Step s4-2, the hardware wallet waits for receiving a first matching request sent from the first terminal, and matches with the first terminal when the first matching request is received, and executes Step s5.

Preferably, before deleting the terminal information of the first terminal stored in the white list in Step s6, the method further includes that the hardware wallet parses the shifting match instruction so as to obtain the terminal information of the second terminal; and after deleting the terminal information of the first terminal stored in the hardware wallet, the method further includes storing the terminal information of the second terminal into the white list.

Preferably, before the terminal information of the second terminal is stored into the white list, the method further includes that the hardware wallet determines whether the terminal information of the second terminal is legitimate, if yes, stores the terminal information of the second terminal into the hardware wallet; otherwise, returns a rejecting to connection response, and ends the procedure.

Preferably, the hardware wallet determines whether the terminal information of the second terminal is legitimate specifically includes Step s01, the hardware wallet receives a second connecting request sent from the second terminal, parses the second connecting request to obtain the terminal information of the second terminal; and Step s02, the hardware wallet determines whether the terminal information of the second terminal obtained by parsing the second connecting request is the same as the terminal information of the second terminal obtained by parsing the shifting match instruction, if yes, the terminal information of the second terminal is legitimate; otherwise, the terminal information of the second terminal is illegitimate.

Preferably, after the hardware wallet connects to and matches with the second terminal, the method further includes that the hardware wallet stores the terminal information of the second terminal into the matching list of the hardware wallet.

Embodiment 2

Figure 2:
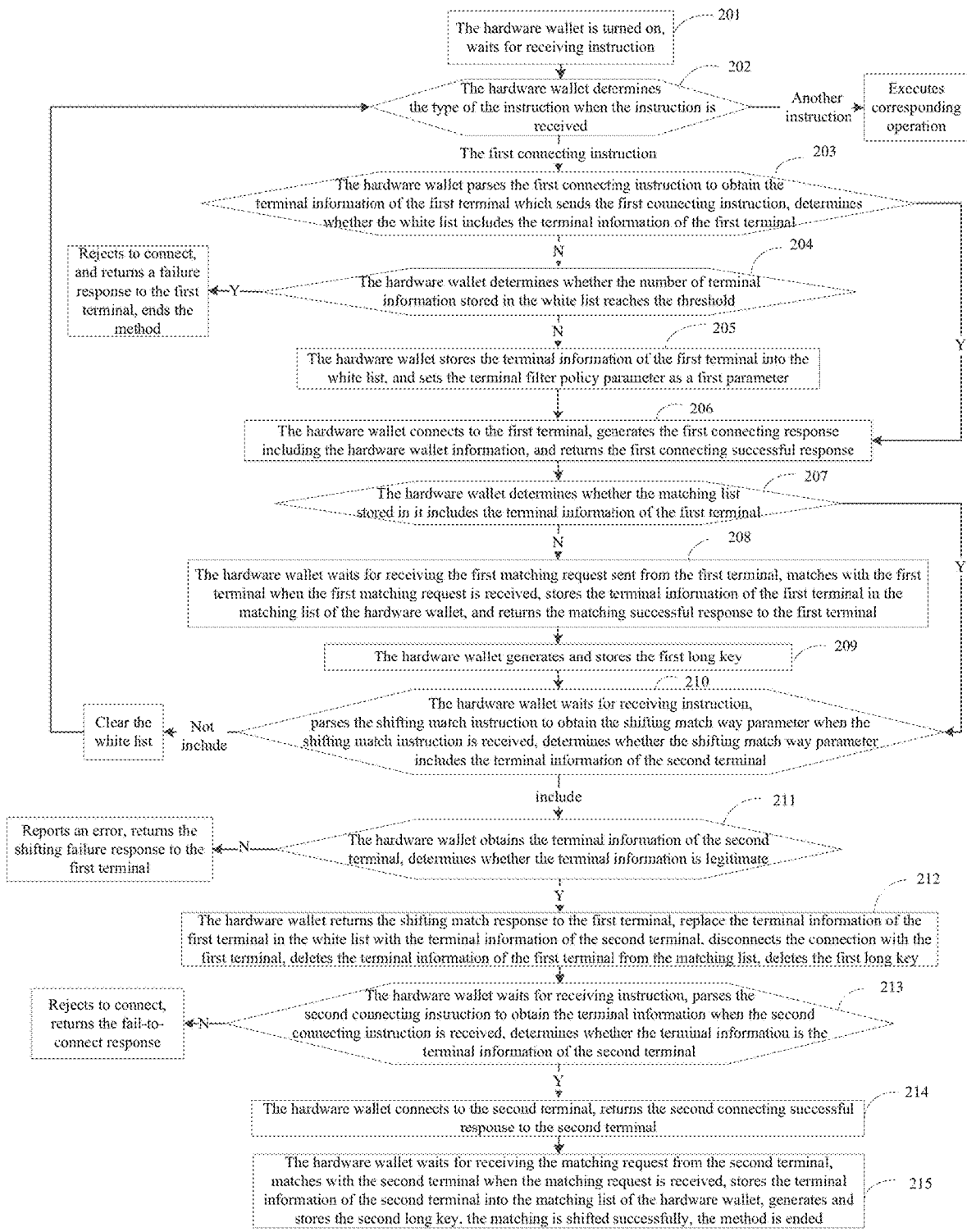
FIG. 2 is a flow diagram of a method for avoiding a hardware wallet from being matched without authorization according to Embodiment 2 of the present invention.

It provides a method for avoiding a hardware wallet from being matched without authorization according to Embodiment 2 of the present invention. As shown in FIG. 2, the method comprises the following steps.

Step 201, the hardware wallet is turned on, waiting for receiving an instruction.

Step 202, the hardware wallet determines a type of the instruction when the instruction is received, executes Step 203 in the case that the instruction is a first connecting instruction; executes a corresponding operation in the case that the instruction is another type of instruction.

Step 203, the hardware wallet parses the first connecting instruction to obtain terminal information of a first terminal which sends the first connecting instruction, determines whether the terminal information of the first terminal is stored in a white list of the hardware wallet, if yes, executes Step 206; otherwise, executes Step 204.

Step 204, the hardware wallet determines whether a number of the terminal information stored in the white list reaches a threshold value, if yes, rejects to be connected, returns a failure connection response to the first terminal, and ends the procedure; otherwise, executes Step 205, Preferably, in Embodiment 2, the threshold value of the number of the terminal information stored in the while list is 1.

Step 205, the hardware wallet stores the terminal information of the first terminal into the white list, and sets a terminal filter policy parameter as a first parameter.

Preferably, in Step 205, before the hardware wallet stores the terminal information of the first terminal into the white list, the method further includes that the hardware wallet displays the terminal information of the first terminal on the screen, prompts a user to determine whether connects to the terminal, if yes, executes Step 205; otherwise, rejects to connect, and returns the failure connection response to the first terminal.

Preferably, the hardware wallet setting the terminal filter policy parameter of the white list as the first parameter specifically is that the hardware wallet sets the terminal filter policy parameter of the white list as 0x02, which means the hardware wallet permits any terminal to scan it, but just the terminal in the white list can connect to the hardware wallet.

Step 206, the hardware wallet connects to the first terminal, generates a first successful connection response which includes information of the hardware wallet, and returns the first successful connection response to the first terminal.

Step 207, the hardware wallet determines whether the terminal information of the first terminal is in the matching list which is stored in the hardware wallet, if yes, executes Step 209; otherwise, executes Step 208.

Step 208, the hardware wallet waits for receiving the first matching request sent from the first terminal, matches with the first terminal when the first matching request is received, and stores the terminal information of the first terminal into the matching list of the hardware wallet, and returns a matching successful response to the first terminal.

Preferably, when receiving the first matching request, the hardware wallet matches with the first terminal by using a corresponding match mode according to a matching mode identifier.

Preferably, in the case that the matching mode identifier is LE Legency Pairing Passkey Entry, when receiving the first matching request, the hardware wallet matching with the first terminal specifically comprises the following steps.

Step 208-1, the hardware wallet displays a matching code, and receives a first matching confirmation value, a first random number and information of a first terminal.

Preferably, the first matching confirmation value specifically is a value obtained by operating hash algorithm on the matching code, the first random number and the terminal information of the first terminal by the first terminal.

Step 208-2, the hardware wallet generates a second matching confirmation value according to the first random number, the matching code displayed on the hardware wallet and the terminal information of the first terminal, determines whether the first matching confirmation value is equal to the second matching confirmation value, if yes, executes Step 208-3; otherwise, reports an error, and ends the method.

Step 208-3, the hardware wallet generates a second random number, and generates a third matching confirmation value according to the second random number, the displayed matching code and information of the hardware wallet, and sends the third matching confirmation value, the second random number and the information of the hardware wallet to the first terminal.

Step 208-4, the hardware wallet waits for receiving a matching response returned from the first terminal, and determines whether the matching response is a matching successful response, if yes, the matching is successful, the terminal information of the first terminal is put into a matching list of the hardware wallet; otherwise, reports an error, and ends the process.

Step 209, the hardware wallet generates and stores a first long key.

Preferably, Step 209 specifically is that the hardware wallet generates the first long key according to the matching code, the first random number and the second random number, and stores the first long key.

Step 210, the hardware wallet waits for receiving an instruction, and parses a shifting match instructing to obtain a shifting match way parameter when the shifting match instruction sent from the first terminal is received, determines whether the shifting match way parameter includes the terminal information of the second terminal, and clears the white list in the case that the shifting match way parameter does not include the terminal information of the second terminal, and returns to Step 202; and executes Step 211 in the case that the shifting match way parameter includes the terminal information of the second terminal.

Step 211, the hardware wallet obtains the terminal information of the second terminal, and determines whether the terminal information of the second terminal is legitimate, if yes, executes Step 212; otherwise, reports an error, and returns a shifting match unsuccessful response to the first terminal.

Preferably, in Step 211, the hardware wallet executes corresponding operation when another instruction is received.

Preferably, before Step 211, the method further includes that the hardware wallet executes key agreement with the first terminal to obtain a share key.

Preferably, in Step 211, the hardware wallet parsing the shifting match instruction to obtain the terminal information of the second terminal specifically is that the hardware wallet uses separately the first long key and the share key to decrypt the shifting match instruction to obtain the terminal information of the second terminal.

Preferably, the hardware wallet determines whether the terminal information of the second terminal is legitimate specifically is that the hardware wallet displays the terminal information of the second terminal, prompts the user to determine whether the match needs to be shifted, if yes, the terminal information of the second terminal is legitimate; otherwise, the terminal information of the second terminal is illegitimate.

Step 212, the hardware wallet returns the shifting match response to the first terminal, replaces the terminal information of the first terminal in the white list with the terminal information of the second terminal, disconnects a connection with the first terminal, deletes the terminal information of the first terminal from the matching list, and deletes the first long key.

Step 213, the hardware wallet waits for receiving an instruction, parses a second connecting instruction to obtain terminal information when the second connecting instruction is received, and determines whether the terminal information which is obtained is the terminal information of the second terminal, if yes, executes Step 214; otherwise, rejects to connect, and returns a fail-to-connect response.

Preferably, Step 213 further includes that the hardware wallet executes the corresponding operation according to a received instruction when another instruction is received;

Step 214, the hardware wallet connects to the second terminal, and returns the second connection successful response to the second terminal.

Preferably, the second connection successful response includes the information of the hardware wallet.

Step 215, the hardware wallet waits for receiving a matching request from the second terminal, matches with the second terminal when the matching request is received from the second terminal, and stores the terminal information of the second terminal into the matching list of the hardware wallet, and generates and stores a second long key, so that the matching is shifted successfully, then the method is ended.

Preferably, Step 215 further includes that the hardware wallet returns the second matching successful response to the second terminal.

Embodiment 3

Figure 3A:
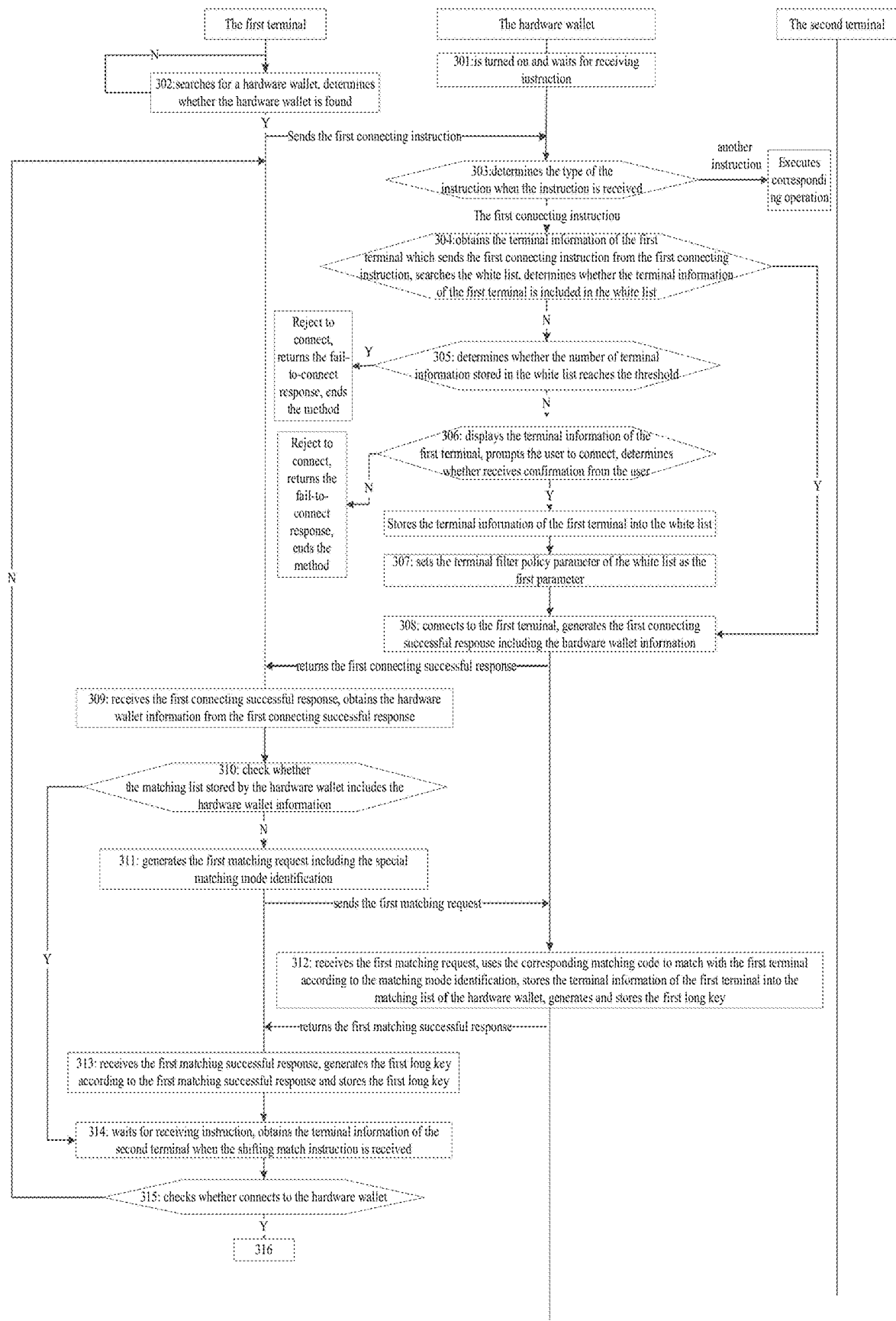
FIG. 3A and FIG. 3B are a flow diagram of a method for avoiding a hardware wallet from being matched without authorization according to Embodiment 3 of the present invention.
Figure 3B:
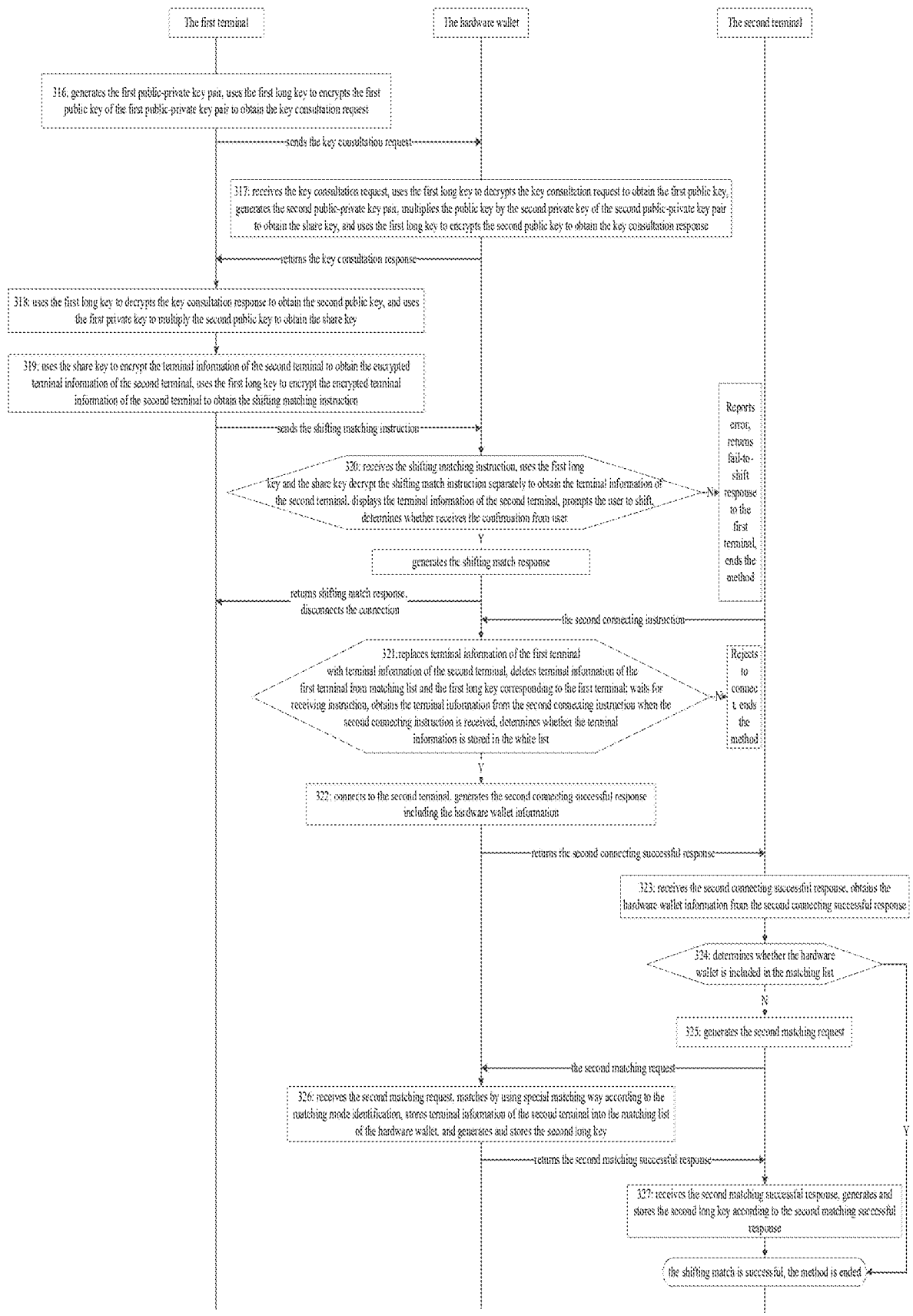
Figure 4:
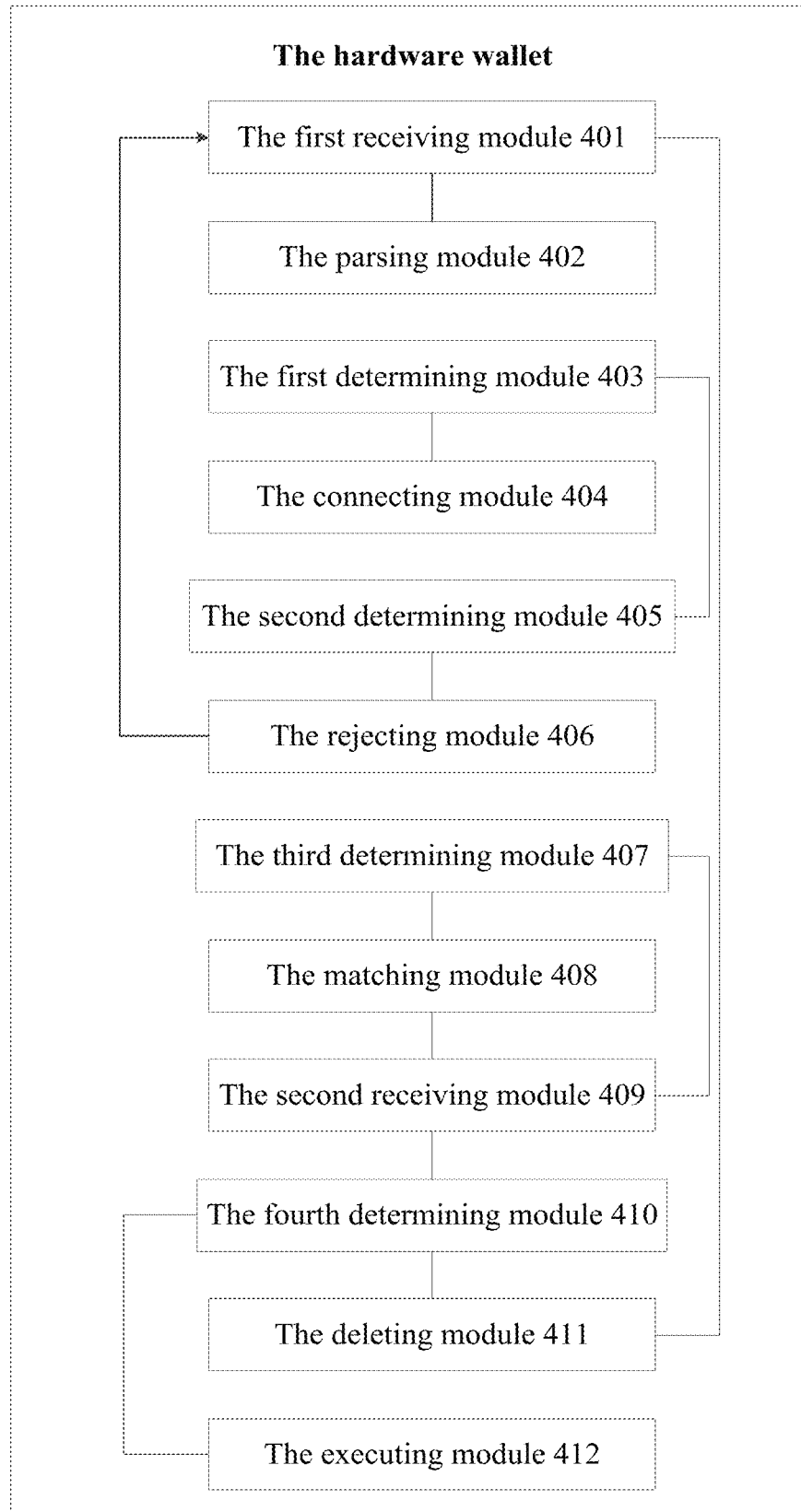
FIG. 4 is a structure chard of a hardware wallet according to Embodiment 4 of the present invention.

According to Embodiment 3 of the present invention, it provides a method for avoiding a hardware wallet from being matched without authorization. As shown in FIG. 3A and FIG. 3B, the method includes the following steps.

Step 301, the hardware wallet is turned on, and waits for receiving an instruction.

Step 302, a first terminal searches for the hardware wallet, and determines whether the hardware wallet is found, if yes, sends a first connecting instruction to the hardware wallet; otherwise, continues to execute Step 302.

Step 303, the hardware wallet determines a type of the instruction when receiving an instruction, executes Step 304 if the instruction is the first connecting instruction; executes corresponding operation if the instruction is another type of instruction.

Step 304, the hardware wallet obtains the terminal information of the first terminal which sends the first connecting instruction from the first connecting instruction, searches for a white list, and determines whether the terminal information of the first terminal is included in the white list, if yes, executes Step 308; otherwise, executes Step 305.

Step 305, the hardware wallet determines whether the number of terminals which are stored in the white list reaches a threshold value, if yes, rejects to connect, and returns a connecting unsuccessful response, and ends the method; otherwise, executes Step 306.

Preferably, in Embodiment 3, the threshold of the number of terminals which are stored in the white list is 1.

Step 306, the hardware wallet displays the terminal information of the first terminal, and prompts a user to connect, and determines whether a confirmation from the user is received, if yes, stores the terminal information of the first terminal into the white list, and executes Step 307; otherwise, rejects to connect, and returns the connecting unsuccessful response, then ends the process.

Step 307, the hardware wallet sets a terminal filter policy parameter as a first parameter.

Preferably, Step 307 specifically is that the hardware wallet sets the terminal filter policy parameter of the white list as 0x02 which means to permit any terminal to scan, but only the terminal in the white list can connect with the hardware wallet.

Step 308, the hardware wallet connects with the first terminal, generates a first connecting successful response including the information of the hardware wallet, and returns the first connecting successful response to the first terminal.

Step 309, the first terminal receives the first connecting successful response, and obtains the information of the hardware wallet from the first connecting successful response.

Step 310, the first terminal checks whether a matching list stored in the first terminal stores the information of the hardware wallet, if yes, executes Step 314; otherwise, executes Step 311.

Step 311, the first terminal generates the first matching request which includes a special matching mode identifier, and sends the first matching request to the hardware wallet.

Preferably, the first matching request further includes the terminal information of the first terminal.

Step 312, the hardware wallet receives the first matching request, and uses a corresponding matching mode to match with the first terminal according to the matching mode identifier, stores the terminal information of the first terminal into the matching list in the hardware wallet, and generates and stores the first long key, then returns a first matching successful response to the first terminal.

Preferably, Step 312 specifically includes the steps as follows.

Step 312-1, the hardware wallet receives the first matching request, and displays a matching code.

Step 312-2, the first terminal receives the matching code input by the user, generates the first random number, and generates a first matching confirmation value according to the first random number, the matching code and the terminal information of the first terminal, and sends the first matching confirmation value, the first random number and the terminal information of the first terminal to the hardware wallet.

Preferably, generating the first matching confirmation value specifically is that the first terminal operates hash algorithm on the matching code, the first random number and the terminal information of the first terminal which are input by the user so as to obtain the first matching confirmation value.

For instance, the terminal information of the first terminal is a MAC address of the terminal.

Step 312-3, the hardware wallet generates a second matching confirmation value according to the first random number, the matching code generated by the hardware wallet and the terminal information of the first terminal, and determines whether the first matching confirmation value matches with the second matching confirmation value, if yes, executes Step 312-4; otherwise, the match is unsuccessful, the hardware wallet reports an error and ends the method.

Preferably, Step 312-3 specifically is that the hardware wallet operates hash algorithm on the first random number, the matching code generated by the hardware wallet and the terminal information of the first terminal, and determines whether the first matching confirmation value matches with the second matching confirmation value, if yes, executes Step 305-3; otherwise, the match is unsuccessful, the hardware wallet reports an error, then ends the method.

Step 312-4, the hardware wallet generates the second random number, generates a third confirmation value according to the second random number, the matching code and the information of the hardware wallet, and sends the second random number, the information of the hardware wallet and the third matching confirmation value to the first terminal.

Preferably, generating the third matching confirmation value specifically is that the hardware wallet operates hash algorithm on the second random number, the matching code generated by the hardware and the information of the hardware wallet to obtain the third matching confirmation value.

For instance, the information of the hardware wallet can be a Bluetooth MAC address of the hardware wallet.

Step 312-5, the first terminal receives the second random number, the information of the hardware wallet and the third matching confirmation value, and generates a fourth matching confirmation value according to the matching code input by the user, the second random number and the information of the hardware wallet, and determines whether the third matching confirmation value matches with the fourth matching confirmation value, if yes, the match is successful; otherwise, reports an error, then ends the method.

Preferably, Step 312-5 specifically is that the first terminal receives the second random number, the information of the hardware wallet and the third matching confirmation value, operates hash algorithm on the matching code input by the user, the second random number and the information of the hardware wallet so as to obtain the fourth matching confirmation value, and determines whether the third matching confirmation value matches with the fourth matching confirmation value, if yes, the match is successful; otherwise, the match is unsuccessful, the hardware wallet reports an error then ends the process.

Step 313, the first terminal receives the first matching successful response, and generates the first long key according to the first matching successful response and stores the first long key.

Step 314, the first terminal waits for receiving an instruction, and obtains the terminal information of the second terminal when the shifting match instruction is received.

Preferably, the terminal information of the second terminal can be a first terminal which is input by the user manually, or be obtained from the second terminal after the hardware wallet matches with the second terminal via user's operation.

Step 315, the first terminal checks whether it connects with the hardware, if yes, executes Step 316; otherwise, returns to Step 302.

Step 316, the first terminal generates a first public-private key pair, uses the first long key to encrypts a first public key of the first public-private key pair to obtain a key consultation request, and sends the key consultation request to the hardware wallet.

Step 317, the hardware wallet receives the key consultation request, uses the first long key to decrypt the key consultation request to obtain the first public key, generates a second public-private key pair, and multiplies the first public key by a second private key of the second public-private key pair to obtain a share key, and uses the first long key to encrypt the second public key so as to obtain a key consultation response, and returns the key consultation response to the first terminal.

Step 318, the first terminal uses the first long key to decrypt the key consultation response to obtain the second public key, and multiplies the first private key by the second public key to obtain the share key.

Step 319, the first terminal uses the share key to encrypt the terminal information of the second terminal to obtain an encrypted terminal information of the second terminal, and uses the first long key to encrypt the encrypted terminal information of the second terminal to obtain a shifting match instruction, and sends the shifting match instruction to the hardware wallet.

Step 320, the hardware wallet receives the shifting match instruction, uses the first long key and the share key to decrypt the shifting match instruction separately to obtain the terminal information of the second terminal, displays the terminal information of the second terminal, and prompts the user to shift the match, and determines whether a confirmation is received from the user, if yes, generates a shifting match response, and sends the shifting match response to the first terminal, and disconnects the connection with the first terminal, and executes Step 321; otherwise, reports an error, returns a shifting match unsuccessful response to the first terminal, then ends the method.

Preferably, after Step 320, the method further includes that the first terminal disconnects the connection with the hardware wallet when the first terminal receives the shifting match response, deletes the information of the hardware wallet from the matching list stored in the first terminal, and deletes the first long key which corresponds to the hardware wallet.

Step 321, the hardware wallet replaces the terminal information of the first terminal in the white list with the terminal information of the second terminal, deletes the terminal information of the first terminal from the matching list, and deletes the first long key corresponding to the first terminal; waits for receiving a connecting instruction, obtains the terminal information from a second connecting instruction when the second connecting instruction is received, and determines whether the terminal information is stored in the white list, if yes, executes Step 322; otherwise, rejects to connect, then ends the method.

Step 322, the hardware wallet connects to the second terminal, generates a second connecting successful response including the information of the hardware wallet, and returns the second connecting successful response to the second terminal.

Step 323, the second terminal receives the second connecting successful response, and obtains the information of the hardware wallet from the second connecting successful response.

Step 324, the second terminal determines whether the matching list stored by the second terminal includes the obtained information of the hardware wallet, if yes, the matching is shifted successfully, and the method is ended; otherwise, executes Step 325.

Step 325, the second terminal generates the second matching request, and sends the second matching request to the hardware wallet.

Step 326, the hardware wallet receives the second matching request, performing matching by using a specific way according to the matching mode identifier, stores the terminal information of the second terminal into the matching list of the hardware wallet, generates and stores the second long key, and returns the second matching successful response to the second terminal.

Step 327, the second terminal receives the second matching successful response, generates the second long key according to the second matching successful and stores the second long key, and the matching is shifted successfully, then the method is ended.

Embodiment 4

According to Embodiment 4, it provides a hardware wallet for avoiding from being matched without authorization, includes
- a first receiving module 401, which is configured to wait for receiving a connecting request, and trigger a parsing module 402 when the connecting request is received;
- a parsing module 402, which is configured to parse the connecting request so as to obtain the terminal information of a first terminal when the first receiving module 401 receives the connecting request;
- a first determining module 403, which is configured to check a white list stored in the hardware wallet, and determine whether the white list is empty;
- a connecting module 404, which is configured to permit the first terminal to connect to the hardware wallet when the first determining module 403 determines that the white list is empty, and add the terminal information of the first terminal into the white list;
- a second determining module 405, which is configured to determine the terminal information stored in the white list is the same as the terminal information of the first terminal when the first determining module 403 determines that the white list is not empty;
- the connecting module 404 is further configured to permit the first terminal to connect when the second determining module 405 determines that the terminal information stored in the white list is the same as the terminal information of the first terminal, and trigger a third determining module 407;
- a rejecting module 406, which is configured to reject the first terminal to connect to the hardware wallet when the second determining module 405 determines that the terminal information stored in the white list is not the same as the terminal information of the first terminal, and then the rejecting module 406 triggers the first receiving module 401;
- the third determining module 407, which is configured to determine whether the hardware wallet has matched with the first terminal;
- a matching module 408, which is configured to match with the first terminal when the third determining module 407 determines that the hardware wallet does not match with the first terminal, and trigger a second receiving module 409;
- the second receiving module 409, which is configured to receive an instruction sent from the first terminal when the third determining module 407 determines that the hardware wallet has matched with the first terminal;
- the second receiving module 409 is further configured to receive the instruction sent from the first terminal after the matching module matches with the first terminal;
- a fourth determining module 410, which is configured to determine a type of the instruction when the second receiving module 409 receives the instruction sent from the first terminal, and trigger a deleting module 411 in the case that the instruction is the shifting match instruction; and trigger an executing module 412 in the case that the instruction is another instruction;
- the deleting module 411, which is configured to delete the terminal information of the first terminal stored in the white list when the fourth determining module 410 determines that the instruction is the shifting match instruction, and then the deleting module 411 triggers the first receiving module 401;
- the executing module 412, which is configured to execute a corresponding operation when the fourth determining module 410 determines that the instruction is another instruction.

Preferably, the hardware wallet further includes
- a turning on module, which is configured to turn on the hardware wallet.

Preferably, in the hardware wallet, the terminal information of the first terminal includes a name of the first terminal and a MAC address of the first terminal.

Preferably, in the hardware wallet, the third determining module includes
- a determining sub-module which is configured to determine whether the matching list stored in the hardware wallet includes the terminal information of the first terminal;
- a receiving sub-module which is configured to receive the first matching request sent from the first terminal when the determining sub-module determines that there is no terminal information of the first terminal in the matching list; and
- a matching sub-module which is configured to match with the first terminal when the receiving sub-module receives the first matching request sent from the first terminal, and then the matching sub-module triggers the second receiving module.

Preferably, the hardware wallet further includes that
- a second parsing module, which is configured to parse the shifting match instruction before the deleting module deletes the terminal information of the first terminal stored in the white list, and then the second parsing module obtains terminal information of the second terminal; and
- a storing module which is configured to store the terminal information of the second terminal into the white list after the deleting module deletes the terminal information of the first terminal from the white list.

Preferably, the hardware wallet further includes
- a fifth determining module which is configured to determine whether the terminal information of the second terminal is legitimate before the storing module stores the terminal information of the second terminal into the white list;
- the storing module is specifically configured to store the terminal information into the white list when the fifth determining module determines that the terminal information of the second terminal is legitimate; and
- a returning module which is configured to return a rejecting to connect response to the second terminal when the fifth determining module determines that the terminal information of the second terminal is illegitimate.

Preferably, in the hardware wallet, the fifth determining module includes
- a receiving sub-module which is configured to receive a connecting request sent from the second terminal;
- a parsing sub-module which is configured to parse the connecting request sent from the second terminal and obtained by the receiving sub-module so as to obtain the terminal information of the second terminal; and
- a second determining sub-module which is configured to determine whether the terminal information of the second terminal obtained by parsing the second connecting request is the same as the terminal information of the second terminal obtained by parsing the shifting match instruction.

Preferably, in the hardware wallet, the storing module is further configured to store the terminal information of the second terminal into the matching list of the hardware wallet after the hardware wallet matches with the second terminal.

The invention claimed is:

1. A method for avoiding a hardware wallet from being matched without authorization, wherein the method comprises the following steps:
   - s1) waiting, by the hardware wallet, for receiving a connecting request, and executing Step s2 in the case that the connecting request is received;
   - s2) parsing, by the hardware wallet, the connecting request so as to obtain terminal information of the first terminal, checking a white list stored by the hardware wallet, and determining whether the white list is empty, if yes, permitting the first terminal to be connected and adding the terminal information of the first terminal into the white list, then executing Step s4; otherwise, executing Step s3;
   - s3) determining, by the hardware wallet, whether terminal information stored in the white list is the same as the terminal information of the first terminal, if yes, permitting the first terminal to be connected, and executing Step s4; otherwise, rejecting the first terminal to be connected, and returning to Step s1,
   - s4) determining, by the hardware wallet, whether the hardware wallet has matched with the first terminal, if yes, executing Step s5; otherwise, matching the hardware wallet with the first terminal, and executing Step s5;
   - s5) waiting, by the hardware wallet, for receiving an instruction sent from the first terminal, and determining a type of the instruction when the instruction is received, and executing Step s6 if the instruction is a shifting match instruction; and executing the corresponding operation according to the instruction if the instruction is another instruction, then ending the method; and
   - s6) deleting, by the hardware wallet, the terminal information of the first terminal stored in the white list, then returning to Step s1.

2. The method as claimed as claim 1, wherein before Step s1, the method further includes that the hardware wallet is turned on.

3. The method as claimed in claim 1, wherein the terminal information of the first terminal in Step s2 includes a name of the first terminal and a MAC address of the first terminal.

4. The method as claimed in claim 1, wherein Step s4 specifically includes the following steps:
   - s4-1) determining, by the hardware wallet, whether a matching list stored in the hardware wallet includes the terminal information of the first terminal, if yes, the hardware wallet has matched with the first terminal, then executing Step s5; otherwise, executing Step s4-2; and
   - s4-2) waiting, by the hardware wallet, for receiving a first matching request sent from the first terminal, and matching with the first terminal when the first matching request is received, then executing Step s5.

5. The method as claimed in claim 1, wherein before deleting the terminal information of the first terminal from the white list, Step s6 further includes that
   - parsing, by the hardware wallet, the shifting match instruction so as to obtain terminal information of the second terminal; and
   - after deleting the terminal information of the first terminal stored in the hardware wallet, the method further includes storing the terminal information of the second terminal into the white list.

6. The method as claimed in claim 5, wherein before storing the terminal information of the second terminal into the white list, the method further includes
   - determining, by the hardware wallet, whether the terminal information of the second terminal is legitimate, if yes, storing the terminal information of the second terminal into the hardware wallet; otherwise, returning a rejecting connect response to the second terminal, then ending the method.

7. The method as claimed in claim 6, wherein determining, by the hardware wallet, whether the terminal information of the second terminal is legitimate specifically includes
   - s01) receiving, by the hardware wallet, a second connecting request sent from the second terminal, and parsing the second connecting request so as to obtain the terminal information of the second terminal; and
   - s02) determining, by the hardware wallet, whether the terminal information of the second terminal obtained by parsing the second connecting request is the same as the terminal information of the second terminal obtained by parsing the shifting match instruction, if yes, the terminal information of the second terminal is legitimate; otherwise, the terminal information of the second terminal is illegitimate.

8. The method as claimed in claim 7, wherein after the hardware wallet connects and matches with the second terminal, the method further includes
   - storing, by the hardware wallet, the terminal information of the second terminal into the matching list of the hardware wallet.

9. A hardware wallet for avoiding from being matched without authorization, wherein the hardware wallet comprises
   - a first receiving module which is configured to wait for receiving a connecting request, and trigger a parsing module in the case that the connecting request is received;
   - the parsing module which is configured to parse the connecting request so as to obtain terminal information of a first terminal in the case that the first receiving module receives the connecting request;
   - a first determining module which is configured to check a white list stored in the hardware wallet, and determine whether the white list is empty;
   - a connecting module which is configured to permit the first terminal to connect and add the terminal information of the first terminal into the white list in the case that the first determining module determines that the white list is empty;
   - a second determining module which is configured to determine whether the terminal information stored in the white list is the same as the terminal information of the first terminal in the case that the first determining module determines that the white list is not empty;
   - the connecting module is further configured to permit the first terminal to connect and trigger the third determining module in the case that the second determining module determines that the terminal information stored in the white list is the same as the terminal information of the first terminal;
   - a rejecting module which is configured to reject the first terminal to connect and trigger the first receiving module in the case that the second determining module determines that the terminal information stored in the white list is different from the terminal information of the first terminal;

the third determining module which is configured to determine whether the hardware wallet has matched with the first terminal;

a matching module which is configured to match with the first terminal and trigger a second receiving module in the case that the third determining module determines that the hardware wallet has not matched with the first terminal;

the second receiving module which is configured to receive an instruction sent from the first terminal in the case that the third determining module determines that the hardware wallet has matched with the first terminal;

the second receiving module is further configured to receive the instruction sent from the first terminal after the matching module matches with the first terminal;

a fourth determining module which is configured to determine a type of the instruction in the case that the second receiving module receives the instruction sent from the first terminal, to trigger a deleting module if the instruction is a shifting match instruction; while to trigger an executing module if the instruction is another type of instruction;

the deleting module which is configured to delete the terminal information of the first terminal stored in the white list and to trigger the first receiving module in the case that the fourth determining module determines that the instruction is the shifting match instruction; and the executing module which is configured to execute corresponding operation according to the instruction in the case that the fourth determining module determines that the instruction is another type of instruction.

10. The hardware wallet as claimed in claim 9, wherein the hardware wallet further comprises a turning on module which is configured to turn on the hardware wallet.

11. The method as claimed in claim 9, wherein the terminal information of the first terminal comprises a name of the first terminal and a MAC address of the first terminal.

12. The hardware wallet as claimed in claim 9, wherein the third determining module comprises a determining sub-module which is configured to determine whether a matching list stored in the hardware wallet itself includes the terminal information of the first terminal;

a receiving sub-module which is configured to receive a first matching request sent from the first terminal in the case that the determining sub-module determines that there is not the terminal information of the first terminal in the matching list; and a matching sub-module which is configured to match with the first terminal and to trigger the second receiving module in the case that the receiving sub-module receives the first matching request sent from the first terminal.

13. The hardware wallet as claimed in claim 9, wherein the hardware wallet further comprises a second parsing module which is configured to parse the shifting match instruction so as to obtain the terminal information of the second terminal before the deleting module deletes the terminal information of the first terminal stored in the white list; and a storing module which is configured to store the terminal information of the second terminal into the white list after the deleting module deletes the terminal information of the first terminal stored in the white list.

14. The hardware wallet as claimed in claim 13, wherein the hardware wallet further comprises a fifth determining module which is configured to determine whether the terminal information of the second terminal is legitimate before the storing module stores the terminal information of the second terminal into the white list;

the storing module is specifically configured to store the terminal information of the second terminal into the white list in the case that the fifth determining module determines that the terminal information of the second terminal is legitimate; and a returning module which is configured to return a connect rejecting response to the second terminal in the case that the fifth determining module determines that the terminal information of the second terminal is illegitimate.

15. The hardware wallet as claimed in claim 14, wherein the fifth determining module includes a receiving sub-module which is configured to receive a second connecting request sent from the second terminal;

a parsing sub-module which is configured to parse the second connecting request, which is sent from the second terminal, and received by the receiving sub-module, so as to obtain the terminal information of the second terminal; and a second determining sub-module which is configured to determine whether the terminal information of the second terminal obtained by parsing the connecting request is the same as the terminal information of the second terminal obtained by parsing the shifting match instruction.

16. The hardware wallet as claimed in claim 15, wherein the storing module is further configured to store the terminal information of the second terminal into the matching list of the hardware wallet after the hardware wallet matches with the second terminal.

\* \* \* \* \*